March 22, 1938. D. W. SHERMAN 2,111,697
ATTACHMENT FOR AUTOMOBILE FRAMES
Filed Nov. 30, 1936
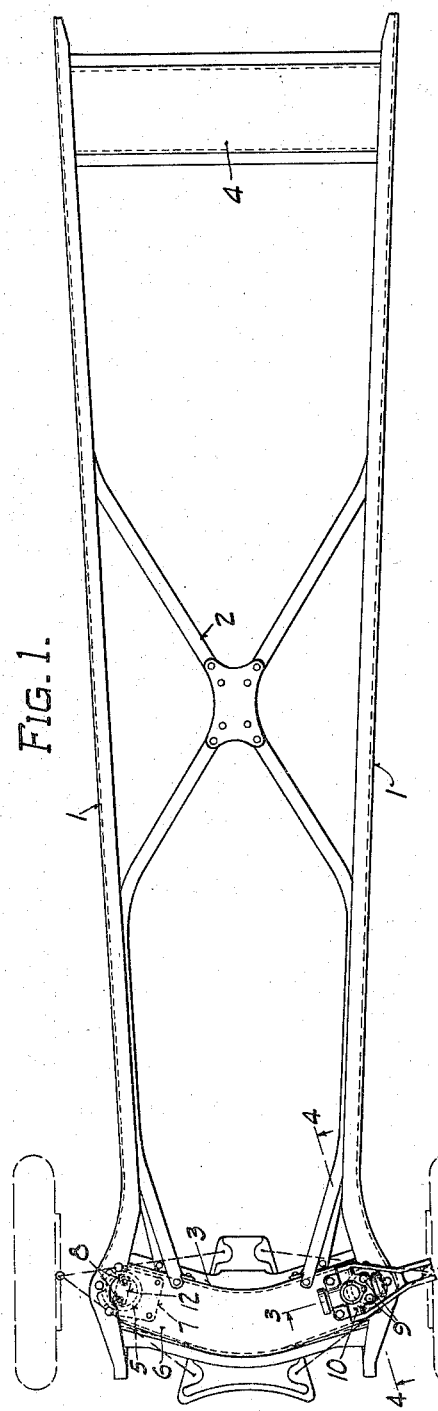
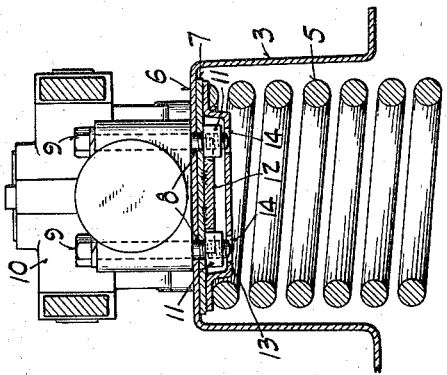
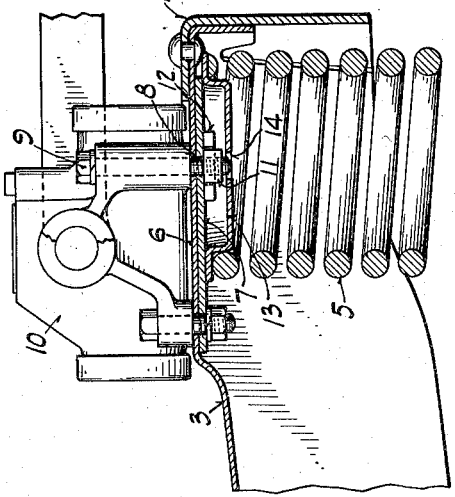
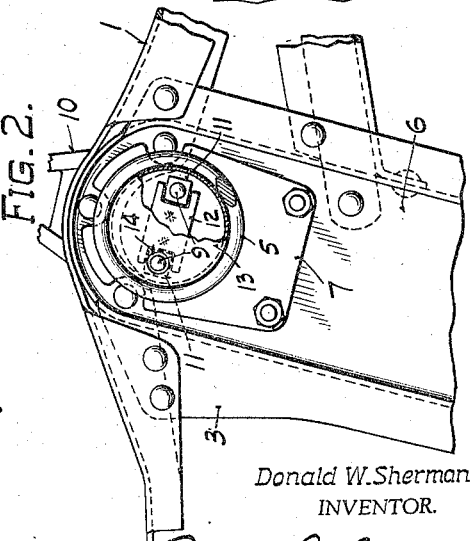
Donald W. Sherman
INVENTOR.
BY
ATTORNEY.

Patented Mar. 22, 1938

2,111,697

UNITED STATES PATENT OFFICE 2,111,697

ATTACHMENT FOR AUTOMOBILE FRAMES

Donald W. Sherman, Shorewood, Wis., assignor to A. O. Smith Corporation, Milwaukee, Wis., a corporation of New York Application November 30, 1936, Serial No. 113,343

3 Claims. (Cl. 280—106)

This invention relates to attachments for automobile frames and more particularly to the mounting of shock absorbers at the forward end of the frame in automobiles employing coil springs for independently attaching the forward wheels to the frame.

In copending application Serial No. 113,342, filed November 30th, 1936, for Shock absorber mounting for automobiles, a shock absorber mounting is shown for use where, in assembling the automobile, the shock absorber is put on after the coil springs are in place. Where, in some circumstances, it is desired to attach the shock absorber prior to positioning of the coil spring, it is possible to employ a different type of construction.

The object of the present invention is to provide a simple and efficient means of attaching the shock absorber and one which will allow its ready removal and reassembly without difficulty, and which may be used to attach the shock absorber either before or after the coil spring is in place.

The accompanying drawing illustrates an embodiment of the invention and the views are as follows:

Figure 1 is a top plan view of an automobile frame with a shock absorber mounted thereon;

Fig. 2 is a bottom plan view of a section of the frame showing the attachment;

Fig. 3 is a section on line 3—3 of Fig. 1 showing the coil spring in place; and

Fig. 4 is a similar section on line 4—4 of Fig. 1.

The automobile frame comprises, in general, a pair of side rails 1, a central X cross member 2, a forward cross member 3 and a rear cross member 4.

The forward cross member 3 is constructed for supporting the front end of the frame on independent coil springs 5 as set forth in U. S. Letters Patent No. 1,965,561. The upper horizontal web 6 of the cross member 3 is provided with a reenforcing plate 7 such as that set forth in the copending application above referred to. There are two holes 8 through the web 6 and plate 7, within the circumference of the spring seat, for the purpose of receiving bolts 9 for attaching the shock absorber 10. The holes 8 are positioned accurately and preferably reamed for accurately positioning the shock absorber. Nuts 11 cooperate with the bolts 9 in securing the attachment.

For the purpose of facilitating assembly, the nuts 11 are held from turning by a plate 12 welded to the plate 7 and extending between the openings 8. The plate 12 has a recess at each end complementary to the nut 11 for holding the same against rotation.

The nuts 11 are held within the recesses in plate 12 prior to and during assembly by means of a pan 13 which forms the seat for the coil spring 5. The pan 13 is formed of sheet metal and is circular, with its flanged rim defining the seat for the spring. The central web of the pan 13 is provided with holes 14 beneath the nuts 11 for receiving the ends of bolts 9. The holes 14 are not of sufficient diameter to allow the nuts 11 to drop out when the bolts 9 are not in place. The distance between the end of the nuts 11 and the pan 13 is less than the thickness of the plate 12 so that the nuts will not escape from the recesses in the plate 12.

In assembling, the shock absorber may be attached either before or after the frame is seated on spring 5. When it is to be attached before, the nut 11 is held in the recess in plate 12 by hand while the bolt 9 is inserted through the base of the shock absorber and through one of the holes 8 and screwed into the nut. After the bolts 9 are tightened the pan 13 is put in place and the coil spring 5 then seated in place. When the shock absorber is to be attached after the coil spring is in place, the nuts 11 are first positioned in the recesses in plate 12 and pan 13 applied to hold them there. Then the coil spring 5 is put in place, thereby holding the nuts 11 in a floating position beneath holes 8 for subsequent convenient entering of the bolts 9.

The shock absorber may be removed at any time without danger of losing the nuts 11, and the construction facilitates reassembly.

Various embodiments of the invention may be employed within its spirit and scope as expressed in the accompanying claims.

I claim:

1. In an automobile in which the chassis frame is independently sprung with respect to the wheels by means of coil springs, a shock absorber mounting comprising means attached to the frame and within the coil spring for holding the attaching nut against rotation, and a pan forming a seat for the coil spring and serving to hold the nut in place during removal of the shock absorber.

2. In an automobile in which the chassis frame is independently sprung with respect to the wheels by means of coil springs, a shock absorber mounting comprising a plate attached to the under side of the frame within the coil spring and having a recess for receiving an attaching nut and preventing its rotation, a bolt passing through the base of the shock absorber and through the frame element into engagement with said nut, and a pan forming a seat for the coil spring and serving to retain the nut in the recess in said plate when the bolt is removed for removal of the shock absorber.

3. In an automobile in which the chassis frame is independently sprung with respect to the wheels by means of coil springs, a shock absorber mounting comprising a bolt passing through the base of the shock absorber and through the frame element into engagement with a nut inside the coil spring, a pan forming a seat for the coil spring and serving to retain the nut in place when the bolt is removed for removal of the shock absorber, and means for preventing rotation of the nut.

DONALD W. SHERMAN.